US006947842B2

(12) United States Patent  
Smith et al.

(10) Patent No.: US 6,947,842 B2
(45) Date of Patent: Sep. 20, 2005

(54) NORMALIZED AND ANIMATED INUNDATION MAPS

(75) Inventors: Michael R. Smith, Wichita, KS (US); Mark David Long, Wichita, KS (US)

(73) Assignee: User-Centric Enterprises, Inc., Wichita, KS (US)

( * ) Notice: Subject to any disclaimer, the term of this patent is extended or adjusted under 35 U.S.C. 154(b) by 216 days.

(21) Appl. No.: 10/336,781

(22) Filed: Jan. 6, 2003

(65) Prior Publication Data

US 2004/0133530 A1 Jul. 8, 2004

(51) Int. Cl.[7] .............................................. G01W 1/00
(52) U.S. Cl. ...................... 702/3; 702/2; 702/5; 702/16
(58) Field of Search .............................. 702/3, 16, 2, 5

(56) References Cited

U.S. PATENT DOCUMENTS

| | | | | | |
|---|---|---|---|---|---|
| 3,733,830 | A | * | 5/1973 | Jacobs | 405/73 |
| 4,458,456 | A | * | 7/1984 | Battle | 52/63 |
| 5,053,778 | A | | 10/1991 | Imhoff | 342/191 |
| 5,379,215 | A | * | 1/1995 | Kruhoeffer et al. | 702/3 |
| 5,751,576 | A | * | 5/1998 | Monson | 700/83 |
| 5,835,386 | A | * | 11/1998 | Orr et al. | 703/2 |
| 5,870,302 | A | * | 2/1999 | Oliver | 700/11 |
| 5,995,903 | A | * | 11/1999 | Smith et al. | 701/211 |
| 6,229,546 | B1 | * | 5/2001 | Lancaster et al. | 345/419 |
| 6,229,549 | B1 | * | 5/2001 | Smith | 345/419 |
| 6,243,483 | B1 | * | 6/2001 | Petrou et al. | 382/103 |
| 6,581,009 | B1 | * | 6/2003 | Smith | 702/3 |
| 2001/0026271 | A1 | * | 10/2001 | Higgins et al. | 345/213 |
| 2002/0055820 | A1 | * | 5/2002 | Scannell | 702/3 |
| 2002/0099504 | A1 | | 7/2002 | Cross et al. | 702/2 |
| 2002/0143469 | A1 | | 10/2002 | Alexander et al. | 702/2 |
| 2003/0097230 | A1 | * | 5/2003 | Garabedian | 702/104 |

FOREIGN PATENT DOCUMENTS

| | | | | | |
|---|---|---|---|---|---|
| JP | 2002298063 | A | * | 10/2002 | G06F/19/00 |
| KR | 2003043115 | A | * | 6/2003 | G06F/17/30 |

OTHER PUBLICATIONS

Jones et al., "Near–Real–Time Flood Modeling and Mapping for the Internet", Aug. 1, 2002, Proceedings of the Second Federal Interagency Hydrologic Modeling Conference, Las Vegas, NV, pp. 1–11.*

Jones et al., "Updating Flood Inundation Maps Efficiently", 1998, U.S. Geological Survey Open–File Report 98–200.*

Jones, J.L., "Near–real time flood inundation mapping pilot project", Apr. 2002, U.S.Geological Survey conference abstract.*

Jones, et al., "Near–Real Time Simulation and Internet Based Delivery of Forecast Flood Inundation Maps Using Two–Dimensional Hydraulic modeling: A Pilot Study of the Snoqualmie River, Washington", 2002, USGS Water–Resources Investigations Report 02–4251.*

K. Wahl et al., "Stream–Gaging Program of the U.S. Geological Survey", U.S. Geological Survey Circular 1123, Reston, Virginia, 1995, printed from http://water.usgs.gov/pubs/circ1123/index.html on Dec. 4, 2002.

G. Austin, "Advanced Hydrologic Prediction Services Concept of Services and Operations", U.S. Department of Commerce, National Oceanic and Atmospheric Administration, Apr. 2002, 11 pages.

(Continued)

*Primary Examiner*—Marc S. Hoff
*Assistant Examiner*—Anthony Gutierrez
(74) *Attorney, Agent, or Firm*—Banner & Witcoff, Ltd.

(57) ABSTRACT

Methods and systems for normalizing flood warnings and potential flood levels across multiple river gauges by converting localized flood stage levels to a datum-based normalized value are disclosed. The normalized flood levels can then be used to plot flood levels from multiple river gauges on an inundation map. Methods and systems are also disclosed for creating animated inundation maps that illustrate flood levels geographically, and may include an indication of the certainty that flooding will reach one or more of the indicated flood levels through the use of multiple colors, shades, dithering, or the like.

21 Claims, 7 Drawing Sheets

OTHER PUBLICATIONS

Advanced Hydrologic Prediction Service, printed from http://www.crh.noaa.gov/ahps/about.htm on Dec. 14, 2002, 3 pages.

Dams in Tennessee, Tennessee Emergency Management Agency, printed from http://www.tnema.org/EmerPrep/TVA_Dams.htm on Dec. 4, 2002, 3 pages.

Storm Surge at HurricaneTrack.com, Hurricane Strom Surge, printed from http://hurricanetrack.com/surge.html on Dec. 4, 2002, 3 pages.

J. Jones, "Near–Real–Time Flood Inundation Mapping Pilot Project", printed from http://gsa.confex.com/gsa/2002CD/finalprogram/abstract_35261.htm on Mar. 26, 2003, 1 page.

R. Pielke, Jr., "Who Decides? Forecasts and Responsibilities in the 1997 Red River Flood", Applied Behavioral Science Review, vol. 7, No. 2, pp. 83–101, 1999.

Inundation mapping: Fort Collins, printed from http://ford-consulting.com/inundationamappingqafortacollins.htm on Apr. 10, 2003, 1 page.

VAI Home, Vieux & associates, printed from http:///www.vieuxinc.com on Apr. 10, 2003, 1 page.

VAI Radar Rainfall, Vieux & associates, printed from http:///www.vieuxinc.com/serv05.htm on Apr. 10, 2003, 1 page.

VAI Radar Rainfall, Vieux & associates, printed from http:///www.vieuxinc.com/serv02.htm on Apr. 10, 2003, 1 page.

Advanced Hydrologic Prediction Service—National Weather Service, printed from http://www.crh.noaa.gov/ahps/ on Apr. 10, 2003, 1 page.

National Weather Service Advanced Hydrologic Prediction Service, printed from http://www.crh.noaa.gov/cgi-bin/ahps.cgi?jkl&bbvk2 on Apr. 10, 2003, 3 pages.

* cited by examiner

```
WGUS42 KILM 201703
FLWTLM
NCC017-019-047-129  41-211700-

BULLETIN...IMMEDIATE BROADCAST REQUESTED
RIVER FLOOD WARNING
NATIONAL WEATHER SERVICE WILMINGTON NC
1201 PM EST WED NOV 20 2001

...A RIVER FLOOD WARNING HAS BEEN ISSUED FOR THE CAPE FEAR

FOR THE CAPE FEAR RIVER, INCLUDING WILLIAM O HUSKE L&D 3 , ELIZABETHTOWN, MINOR
FLOODING IS FORECASTED.

FOR THE CAPE FEAR AT WILLIAM O HUSKE L&D 3  THE LATEST STAGE IS 40.3 FEET AT 8
AM WEDNESDAY.  MINOR FLOODING IS FORECAST, WITH A MAXIMUM STAGE OF 42.1 FEET
AROUND 1 AM FRIDAY. THIS LEVEL IS 0.1 FEET ABOVE FLOOD STAGE.  THE RIVER WILL
RISE ABOVE THE FLOOD STAGE OF 42.0 FEET AROUND 7 PM THURSDAY.  THE RIVER WILL
FALL BELOW FLOOD STAGE AROUND 7 AM FRIDAY.  AT 42.0 FEET, WATER LEVELS WILL TOP
THE NAVIGATIONAL LOCK. OPERATIONS STOP AND THE EQUIPMENT MUST BE REMOVED. MINOR
FLOODING WILL OCCUR ON LAND ADJACENT TO THE LEFT BANK OF THE RIVER

FOR THE CAPE FEAR AT ELIZABETHTOWN, THE LATEST STAGE IS 19.1 FEET AT 1 PM
TUESDAY.  MINOR FLOODING IS FORECAST, WITH A MAXIMUM STAGE OF 21.2 FEET AROUND
1 PM FRIDAY. THIS LEVEL IS 1.2 FEET ABOVE FLOOD STAGE.  THE RIVER WILL RISE
ABOVE THE FLOOD STAGE OF 20.0 FEET AROUND 5 AM THURSDAY.  THE RIVER WILL FALL
BELOW FLOOD STAGE AROUND 11 AM SUNDAY.  AT 20.0 FEET, FLOODING WILL BEGIN ALONG
THE LEFT BANK OF THE RIVER.

PEOPLE WITH INTERESTS ALONG THE RIVER SHOULD TAKE THE NECESSARY PRECAUTIONS TO
PROTECT LIFE AND PROPERTY FROM THE FLOOD WATERS.

$$
                    FLD  OBSERVED         FORECAST 8AM
LOCATION            STG  STG  DAY TIME    THU   FRI   SAT   SUN   MON

CAPE FEAR RIVER
   WILLIAM O HUSKE  42   40.3  WED  8 AM   42.0  42.0  41.3  40.1  39.0
   ELIZABETHTOWN    20   19.1  TUE  1 PM   20.1  21.2  20.3  20.2  19.0

… # NORMALIZED AND ANIMATED INUNDATION MAPS

FIELD OF THE INVENTION

The invention relates generally to meteorology and hydrology. More specifically, the invention provides methods and systems for generating and animating hydrologic inundation maps for displaying normalized flood level information.

BACKGROUND OF THE INVENTION

Each year, floods are a major cause of economic loss and loss of life in the United States, causing millions of dollars in damages each year. In addition, floods cause much inconvenience to those affected by the flood due to cleanup, temporary or permanent relocation, etc. It should be possible to mitigate economic loss, inconvenience, and loss of life by more accurately predicting and conveying information regarding specific geographic areas that will be affected by flooding.

Flood warnings provided by the National Weather Service (NWS) are presently not user-friendly. For example, an actual flood warning issued by the NWS for Wilmington, N.C. on Nov. 20, 2002 is shown in FIG. 1. The flood warning includes river stage levels at which a flood will or is predicted to occur. A river stage level refers to the river's depth at a certain location relative to an arbitrary level on a flood gauge. Because most flood gauge levels are arbitrary, they can be confusing to the general public and even to emergency responders such as fire and police. For example, it is possible to have a negative (i.e., below zero) river level, even though there is water in the channel. These arbitrary readings cause a great deal of confusion and can even be dangerous, as described in *Who Decides? Forecasts and Responsibilities in 1997 Red River Flood*, by Roger A. Pielke, Jr., Applied Behavior Science Review, 1999, 7(2), 83–101).

In addition, very few members of the general public know whether they will be affected by a flood based on the textual warning illustrated in FIG. 1 because very few people, if any, are aware of the height of the their location in terms of river stage levels in relation to a specific river gauge. River gauge information, for the public, only becomes important when there is an imminent threat, by which time it is typically too late to mount an educational program. Likewise, emergency officials (e.g., police and fire) are also often unaware of potential flood areas, and cannot accurately prepare for potential flooding or emergency response. Thus, someone familiar with interpreting NWS warnings must translate each warning into a form understandable to the general public in order to provide any sort of understandable flood warning. While newscasters (e.g., via television) often attempt to provide flood warnings, they are generally limited to a broad verbal indication that flooding is possible, and to take necessary precautions. At best, they convey these same technical river level forecasts.

One known means of providing improved flood warnings is through the use of inundation maps. An inundation map is a geographical map indicating areas likely to be flooded as a result of receiving an inundation of water, e.g., from rain, a dam bursting, tsunami, hurricane, or the like. However, most inundation maps created to date are used for estimating the theoretical effects of major natural disasters, not for predicting possible flood areas as a result of rain, and are not prepared in real-time. For example, inundation maps have been used to predict water levels as a result of global warming (e.g., as the icecaps melt), storm surge due to a hurricane, tsunami, a dam bursting, and the like. These inundation maps are created using complex models not based on rainfall prediction or flood warnings from the NWS or some other meteorological prediction service.

The NWS is presently working on developing an advanced hydrologic prediction service (AHPS) to determine a probability that a specific area will flood within a 60-day period. For each specific area, the AHPS indicates one of four probability ranges: >75%, 50–75%, 25–50%, and <25%. The AHPS inundation map is derived from NWS long-term, hydrologic Ensemble Streamflow Prediction (ESP) products. The inundation map gives no information about flood depth above the ground, river stage, flood frequency, or flood return interval nor does the AHPS provide real-time flood information based on imnminent weather. Thus, the AHPS inundation maps are unsuitable for providing flood warnings to the general public based on short-term events, such as a heavy rainstorm.

There are private sector consulting firms which create mesoscale models for small river basins which are capable of generating river stage heights which can be, and in some cases are, turned into inundation maps. However, these are used exclusively on small streams and basins. They do not output contingency levels nor do they produce animated inundation maps suitable for broadcast use.

As indicated above, a river's stage level refers to the depth of the river at a specific location. However, the stage level is indicated and referred to in terms of water depth at that single location only, and is not represented as a uniform measurement throughout a river across multiple river gauges, or between rivers (e.g., where one river feeds into another river). A river gauge is a common tool used to indicate the stage of a river at the location of the river gauge. River gauges, generally, are known in the art and are discussed in detail in U.S. Geological Survey Circular 1123, *Stream-Gaging Program of the U.S. Geological Survey*, 1995. However, because river gauges are not calibrated to a uniform or normalized depth measurement (similar to time being able to be described in Greenwich mean time, or Zulu time), data cannot be consistently plotted for an entire river, or across rivers, using data from multiple river gauges.

Figure 2:
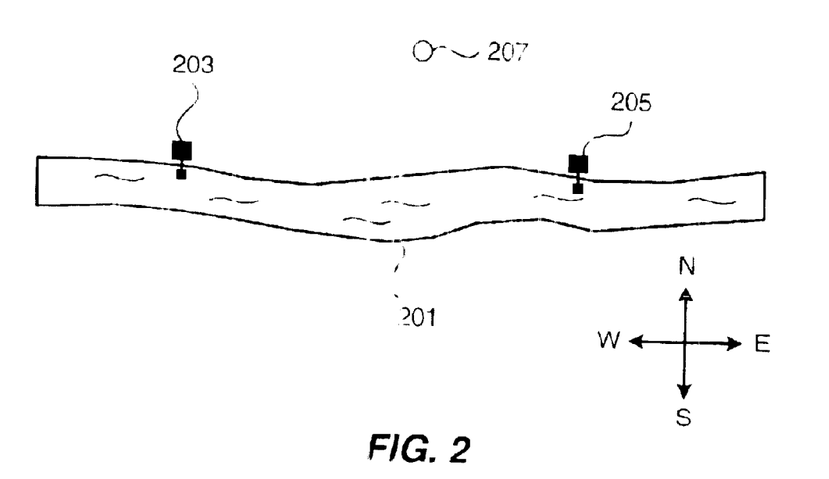
FIG. 2 illustrates river gauge locations on a river.

For example, with reference to FIG. 2, suppose a river 201 has two river gauges 203 and 205, and that the flood stage of the river at each gauge is ten feet. That is, if the river's stage reaches ten feet at either gauge, then the river will overflow its banks and begin to flood. Assume as well that the river 201 flows to the east. Thus, a river stage of ten feet at gauge 203 will necessarily be higher in elevation than a river stage of ten feet at gauge 205, because the river must necessarily flow downhill. This elevation discrepancy creates a problem when attempting to calculate and illustrate on the geographic map the stage level of the river that is required in order for location 207 to be flooded. That is, location 207 can be said to flood at river stage X according to gauge 203, or at river stage Y according to gauge 205, providing inherent confusion when attempting to merge information from two or more river gauges. Flood information thus cannot be plotted accurately for large areas of land using localized river stage information from multiple river gauges.

It would be an advancement in the art to create an improved method of forecasting floods in real time with specificity. It would be a further advancement in the art to provide a way to normalize river gauge measurements so that localized data from multiple river gauges could be used together. It would be a further advancement in the art to develop an improved warning system such as an inundation map to provide clear, understandable flood warnings to members of the general public that also includes the inevitable uncertainty in forecast river stages as a real time heavy rain and flooding event unfolds

BRIEF SUMMARY OF THE INVENTION

To overcome limitations in the prior art described above, and to overcome other limitations that will be apparent upon reading and understanding the present specification, the present invention is directed to methods and systems for more accurately forecasting and predicting flood levels by converting localized flood levels to normalized measurements, and creating real-time inundation maps (optionally animated) that provide clear, understandable flood warnings.

A first aspect of the invention provides a computer-assisted method for creating an inundation map. A computer, upon receiving a flood forecast having a localized flood level for each of multiple river gauges, determines a normalized flood level for each of the localized flood levels, based on the river gauge to which each flood level corresponds, e.g., using each river gauge's datum value. The datum value allows the river levels to be calibrated to sea level or some other uniform baseline, which allows normalization between gauges. Once the flood levels have been normalized, the computer plots the normalized flood levels on a geographic map which, as part of a Geographic Information System (GIS), has sufficient spatial and elevation detail to reproduce the effects of the rising waters. According to an aspect of the invention, the method may be embodied in computer readable instructions in a computer system that automatically normalized the flood levels and plots them on a map.

Because flood forecasts often refer to multiple possible flood crest stage levels, the computer may normalize and plot multiple flood levels for each river gauge, based on the various possible flood levels received or predicted. The multiple map plots can then be integrated into an animated inundation map to illustrate the various possible flood levels.

Another aspect of the invention provides a data structure for an animated inundation map having a first data portion representing a first frame of the animated inundation map, where the first frame illustrates a geographic area flooded to a first elevation based on flood warning information. A second data portion represents a second frame of the animated inundation map, where the second frame illustrates the geographic area flooded to a second elevation based on the flood warning information. In some embodiments, different colors can be used to indicate various flood levels, as well as to indicate a certainty level or probability associated with one or more of the flood levels.

The animated inundation map may also include one or more intermediate frames between the two illustrated flood levels such that when the animation is played, the flood level appears to gradually increase from no flood to the first flood level, and from the first flood level to the second flood level.

BRIEF DESCRIPTION OF THE DRAWINGS

A more complete understanding of the present invention and the advantages thereof may be acquired by referring to the following description in consideration of the accompanying drawings, in which like reference numbers indicate like features, and wherein:

FIG. 1 illustrates a flood warning issued by the National Weather Service (NWS).

DETAILED DESCRIPTION OF THE INVENTION

In the following description of the various embodiments, reference is made to the accompanying drawings, which form a part hereof, and in which is shown by way of illustration various embodiments in which the invention may be practiced. It is to be understood that other embodiments may be utilized and structural and functional modifications may be made without departing from the scope of the present invention.

The present invention provides methods and systems for more accurately forecasting and predicting flood levels by converting flood levels based on localized river depth information to normalized values, thus allowing them to be plotted uniformly on geographical maps, which may in turn be used to create real-time inundation maps that provide clear, understandable flood warnings. While the invention is described with respect to potential flooding of a river and river gauges, the methods and systems described herein may be used to predict potential flooding stemming from any body of water, such as streams, creeks, lakes, and the like, on which a river gauge or other similar depth measuring device can be used. In addition, any sort of river gauge or water depth measuring device may be used. For example, a stick can be used to measure the depth of a river (commonly located on the underside of a bridge support so that it can be read from the river's bank). A counterweight gauge that floats on top of the water, providing an indication of water level, or a pillow gauge, which weighs water on top of the gauge, can alternatively be used. As used herein, the term river gauge refers to any suitable water depth-measuring device.

Figure 3:
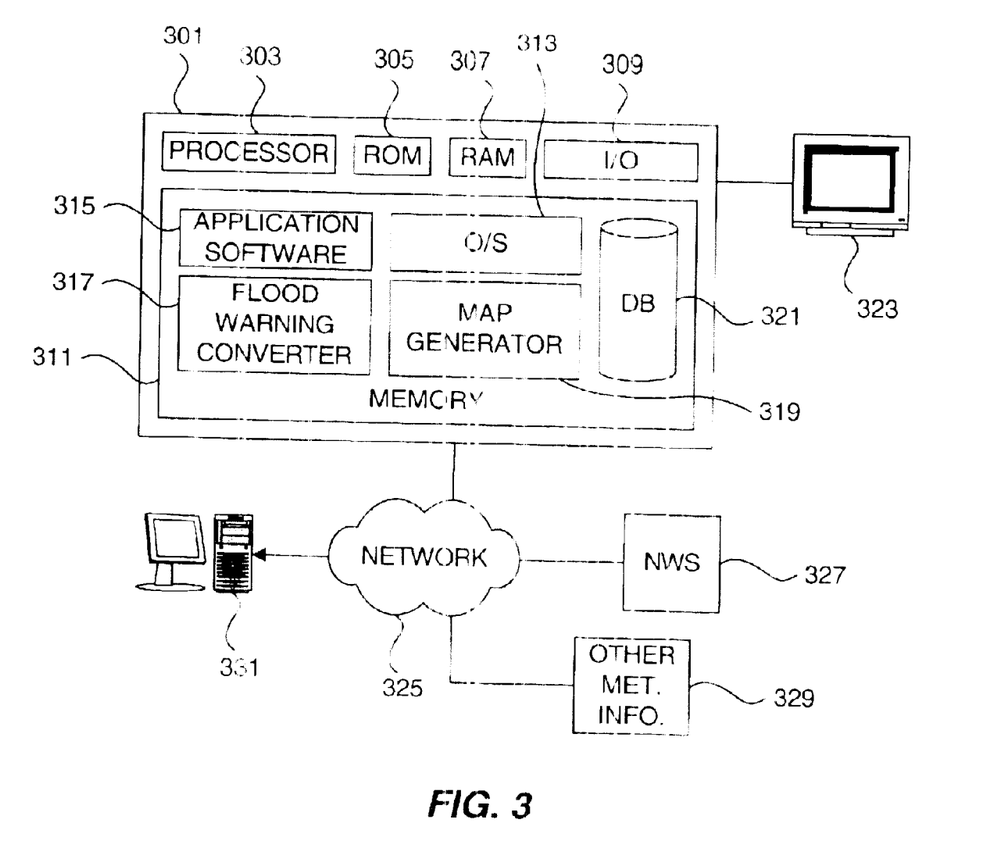
FIG. 3 illustrates a data processing system according to an aspect of the invention.

FIG. 3 illustrates a data processing system that may be used to perform methods described herein. Computer 301 may include a desktop or portable computer, personal digital assistant, tablet-based or handheld computer, mobile communicator, mobile terminal, or any other data processing system programmable to perform as described herein. Computer 301 may include processor 303 for controlling overall operation of the computer, ROM 305, RAM 307, input/output interface 309, and memory 311. I/O 309 may include I/O ports (e.g., USB, Ethernet, Firewire, serial, parallel, etc.) that the computer can use to communicate with attached peripheral devices such as a monitor or other display device 323, mouse (not shown), keyboard (not shown), printer (not shown), or the like. I/O 309 may also be used by computer 301 to connect to a network 325, such as a local area network (LAN), wireless network, wide area network (WAN, such as the Internet), and the like, through which computer 301 can communicate with other entities such as National Weather Service (NWS) 327, other meteorological information providers 329, and/or remote computer 331.

Memory 311 may store an operating system 313, which controls operation of the computer in conjunction with the processor, and application software 315, which controls operation of the methods described herein. Application software 315 may use a flood warning converter module 317 and map generator module 319, each whose function and purpose is further described below. Computer 301 may also include in memory a database 321 of flood warning information, GIS and inundation base maps, as further described below. Those of skill in the art will appreciate that more or fewer program modules may be used, based on design decisions and implementation requirements.

Figure 4:
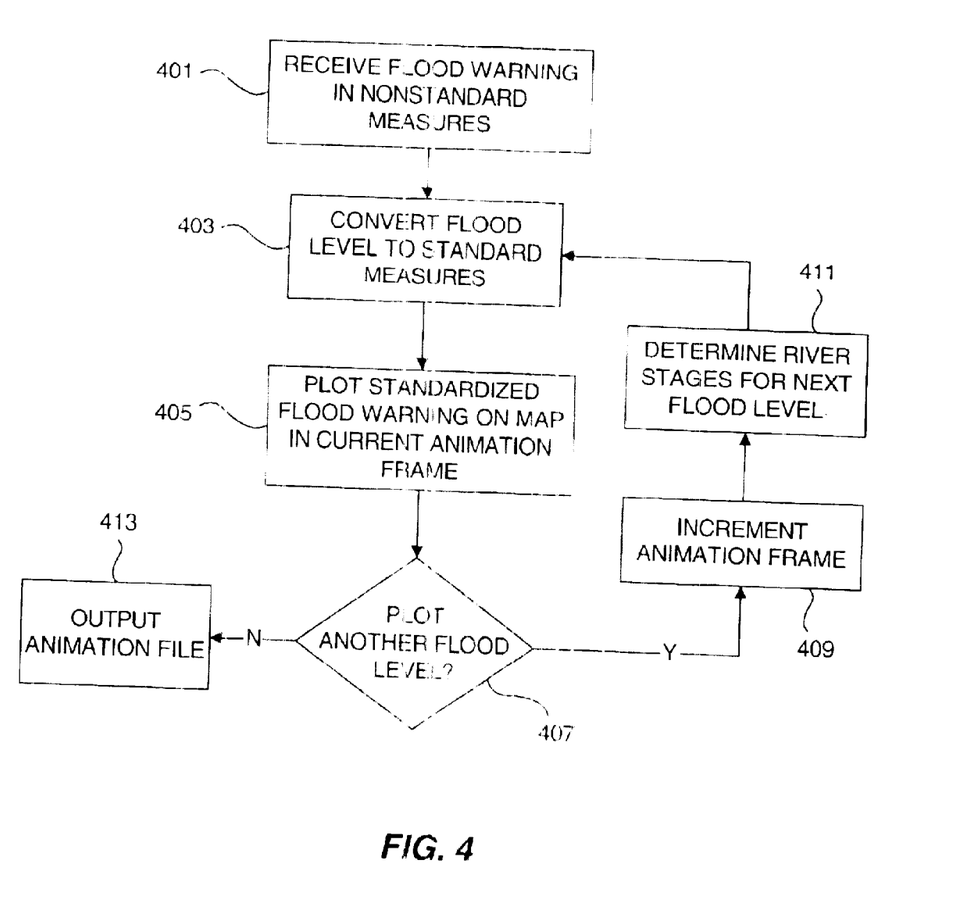
FIG. 4 illustrates a flowchart of a method for providing a uniform base from which normalized flood levels can be calculated and displayed.

With further reference to FIG. 4, an illustrative embodiment of the invention provides a method for converting flood warnings to a normalized form from which flood levels can be calculated and displayed for multiple river gauges, and creating an animated inundation map of potential flood levels. Initially, in step 401, computer 301 receives a flood warning from NWS 327 or some other independent meteorological information provider 329, e.g., the U.S. Army Corps of Engineers, commercial meteorology company or mesoscale hydrological model, and stores the flood warning information in database 321. The flood warning may be received in a form similar to that illustrated in FIG. 1, where flood levels are indicated based on river stage levels. For example, the warning illustrated in FIG. 1 indicates that the Cape Fear River will flood at the 'William O Huske Lock and Dam Number 3' river gauge when the river stage is above 42.0 feet, and will flood on the left bank at the Elizabethtown river gauge when the river stage is above 20.0 feet. The flood warning may be parsed automatically by a computer, e.g., by searching for text strings known to be included in NWS warnings or by analyzing the table at the end of the NWS warning, or data may be entered by a human user of the computer.

In step 403, using flood warning converter module 317, the computer 301 converts the flood warning to a normalized form so that flood and river stage levels at each river gauge can be plotted against each other on a single map (i.e., if stage levels are not normalized, information from only one river gauge can accurately be plotted on a geographical map due to the limitations described above with respect to FIG. 2). According to one illustrative embodiment of the invention, localized stage levels may be converted to normalized sea level elevations based on the datum of each river gauge. That is, each river gauge has a datum value, which is typically the sea-level elevation of the floor or other base value of the river gauge. The flood level's elevation above sea level can then be calculated by adding the localized flood stage level to the datum of the river gauge on which it is based. For example, suppose the datum of the Elizabethtown, N.C. river gauge is 100 feet above sea-level. The normalized flood stage of the river is then determined to be 120 feet by adding the localized flood stage (20 feet) to the datum of the gauge (100 feet). By using the upstream and downstream gauges (in order to provide boundary conditions) in conjunction with the gauge of interest, and by normalizing all three to a sea-level-based elevation, flood level information can be uniformly processed across a larger area of land than previously possible with only a single river gauge. This process can be repeated, if desired, up and down the river. The only restriction is the number of gauges for which there is forecast flood information and the number of forecast points or river levels.

After the flood level has been normalized for each of the reported river gauges, the flood information may be plotted on a map in step 405 for display to a user. Using the normalized flood levels, the computer can interpolate or extrapolate flood levels between rivers and/or river gauges when there is a variance between them. The computer 301 may convert a high resolution Geographic Information System (GIS) map into a virtual "basin", which can be filled in to specified elevations above sea-level to illustrate specific areas, streets, buildings, etc., that will be flooded. Thus, if a normalized flood stage level at the Elizabethtown, N.C. river gauge is determined to be 122 feet above sea level, the computer 301 fills in the basin around the Elizabethtown, N.C. river gauge to an elevation of 122 feet above sea level. This may be done in an animated process where the river swells from within its banks to the highest level which the National Weather Service forecasts, or the meteorologist, the hydrologist or the mesoscale hydrological model indicates the water will attain. The location of the Elizabethtown, N.C. river gauge, as well as other river gauges, is obtainable from the National Weather Service, e.g., via the Internet at www.nws.noaa.gov/oh/hic/current/river_flooding/Loc_info.shtml, which indicates that the Elizabethtown river gauge is located at latitude 34.63333, longitude −78.58333.

After "filling in" the basin to the appropriate level, the computer saves an image of the map in the database 321. In step 407, the computer (or user of the computer) determines whether another flood level needs to be normalized and plotted. For example, a weather forecast may predict multiple possible flood levels, e.g., a flood stage crest of 25 feet if rain stops by a first specified time or a first amount of rainfall is received, or a flood stage crest of 30 feet if rain stops by a second specified time or a second amount of rainfall is received. The basin can be filled in to various elevations to indicate the various predicted flood stage crests. In such a scenario, the computer cycles through steps 403–411 until each flood stage level has been plotted.

In step 409, the computer clears the GIS map so that a new flood stage level may be plotted, and increments the frame in an animation file if an animation based on each flood stage level is simultaneously being created. In step 411 the computer (or user of the computer) determines the next flood stage levels based on the received meteorological information from step 401. The computer then repeats steps 403 and 405 for the next flood stage level.

After the computer 301 has completed normalizing and plotting each flood stage level, the computer compiles and outputs an inundation map, optionally animated. Each frame of the animation may represent the GIS map filled in with one of the flood stage levels, preferably in order of increasing and/or decreasing flood stages. The animated inundation map may be saved as an .AVI file, animated .GIF file, or any other known or later developed animation file type. The inundation map may then be saved in memory 311, sent to a remote computer 331, displayed on display device 323, or manipulated in any way that a data file can be manipulated. The animated inundation map may optionally include additional transition frames illustrating flood levels between the predicted flood levels in order to smooth the transition from one predicted flood level to the next in the animation.

Figure 5A:
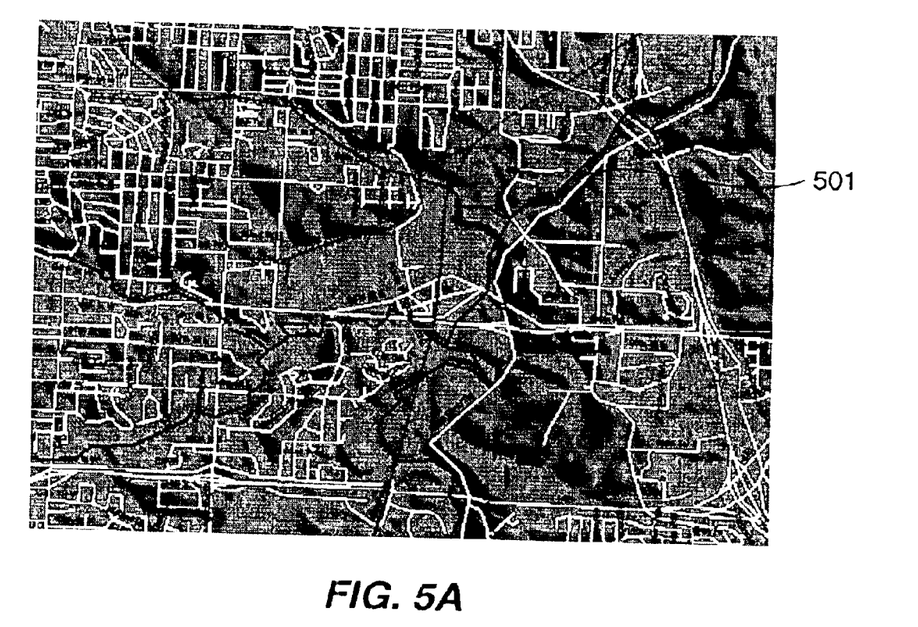
FIGS. 5A–5E illustrated frames of an inundation map animation.
Figure 5B:
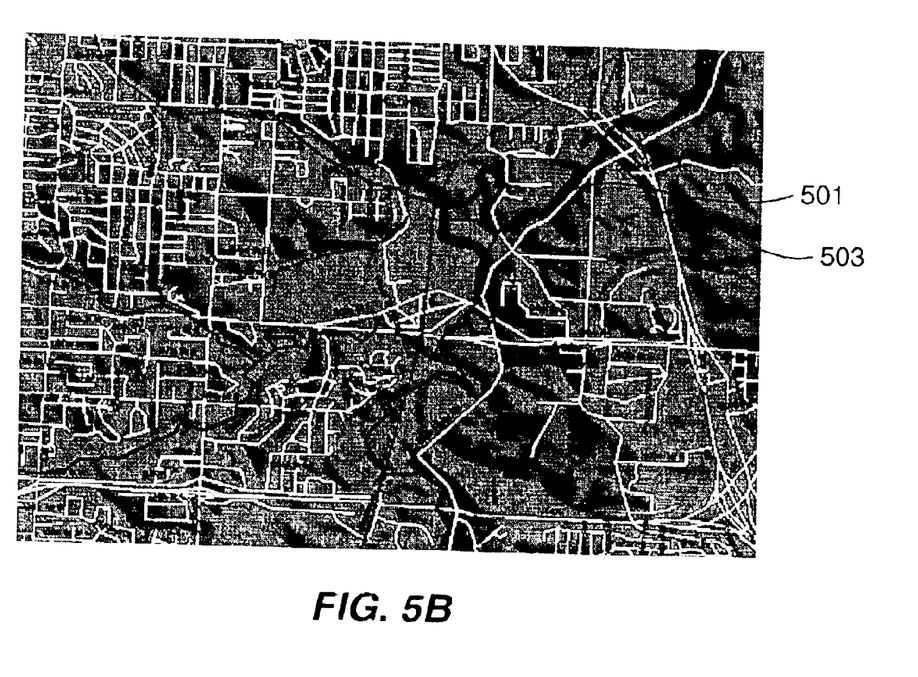
Figure 5C:
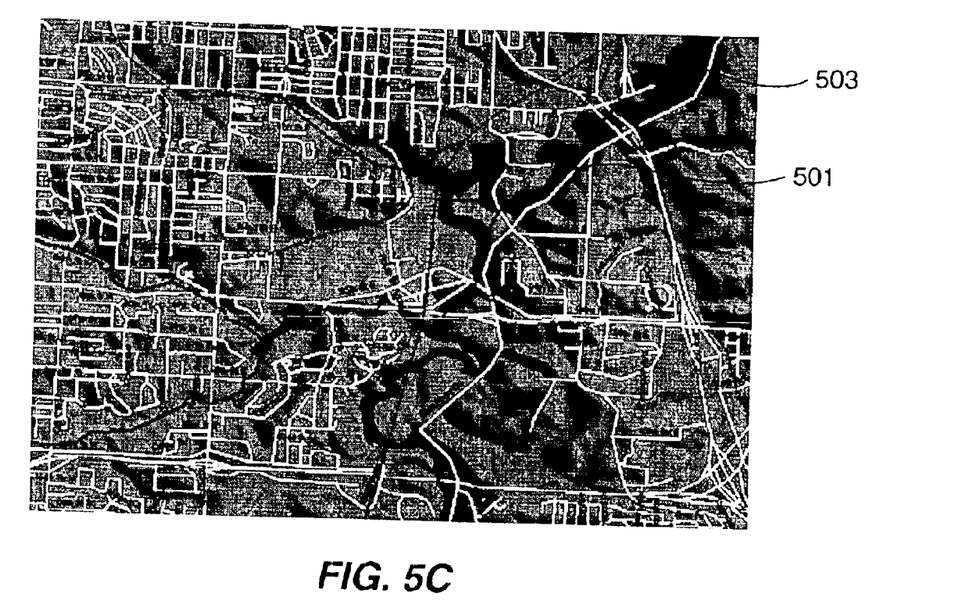
Figure 5D:
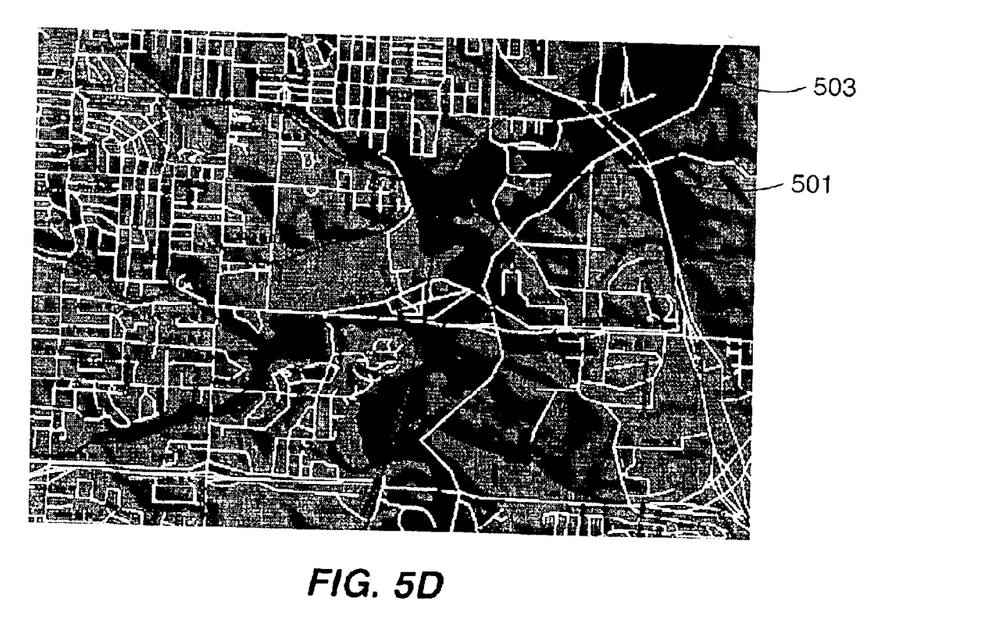
Figure 5E:
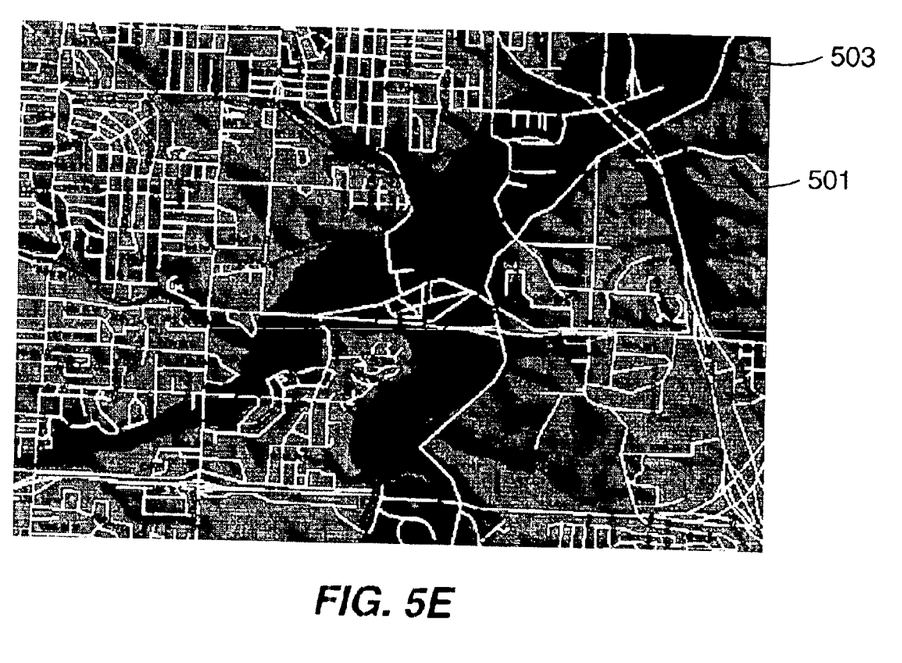

Frames of an animated inundation map are illustrated in FIGS. 5A–5E. FIG. 5A illustrates a normalized flood stage level of the Blue River 501 in metropolitan Kansas City when the river is below the flood stage of the river at Kansas City, e.g., at river gauge no. KCCM7. FIG. 5B illustrates the same basin, e.g., when the flood stage 503 is two feet above the flood stage level of the river gauge. FIG. 5C illustrates the basin, e.g., when the flood stage 503 is four feet above the flood stage level of the river gauge. FIG. 5D illustrates the basin, e.g., when the flood stage 503 is six feet above the flood stage level of the river gauge. FIG. 5E illustrates the basin, e.g., when the flood stage 503 is eight feet above the flood stage level of the river gauge.

Those of skill in the art will appreciate that modifications to the above-described method may be made without departing from the spirit and scope of the invention. For example, certain steps may be performed in other than their recited order, and one or more steps may be optional. In addition, some steps may be performed automatically by the computer, or alternatively based on input received from a user. For example, human intervention may be required to read and interpret each flood forecast, identify predicted flood stage levels, and input the non-normalized flood stage information into computer 301 for conversion to normalized flood stage levels. Alternatively, a computer may parse the received flood warning based on standardized warning information, and enter the pertinent data into the normalization model. That is, when the received flood forecast reports are standardized, computer 301 may automatically parse a flood forecast and determine which flood stage levels to normalize and plot. In addition, the computer may automatically add the transitional animation frames to smooth the transition from one flood stage to another flood stage, such that the animation appears as if the basin is smoothly filling up with water.

According to an aspect of the invention, the animated inundation map may optionally include an indication of a certainty level corresponding to one or more flood stage predictions. For example, assume that the flood stage (i.e., the level at which a river overflows its banks) is 700 feet above sea level. Further assume that the river is forecast to crest (reach its highest point) at 720 feet above sea level if rain stops immediately, and 725 feet above sea level if additional rain falls for some given or unknown period of time. The computer may create a first frame of the animated inundation map by filling the river basin in an animated sequence (i.e., include transition frames) up to 720 feet, depicting which areas, streets, etc. will be flooded. The computer may represent the flood level in a first color (optionally semi-transparent for ease of viewing) and layer it on top of the streets and other markings on the map, which would indicate they have been or certainly will be flooded.

Figure 6:
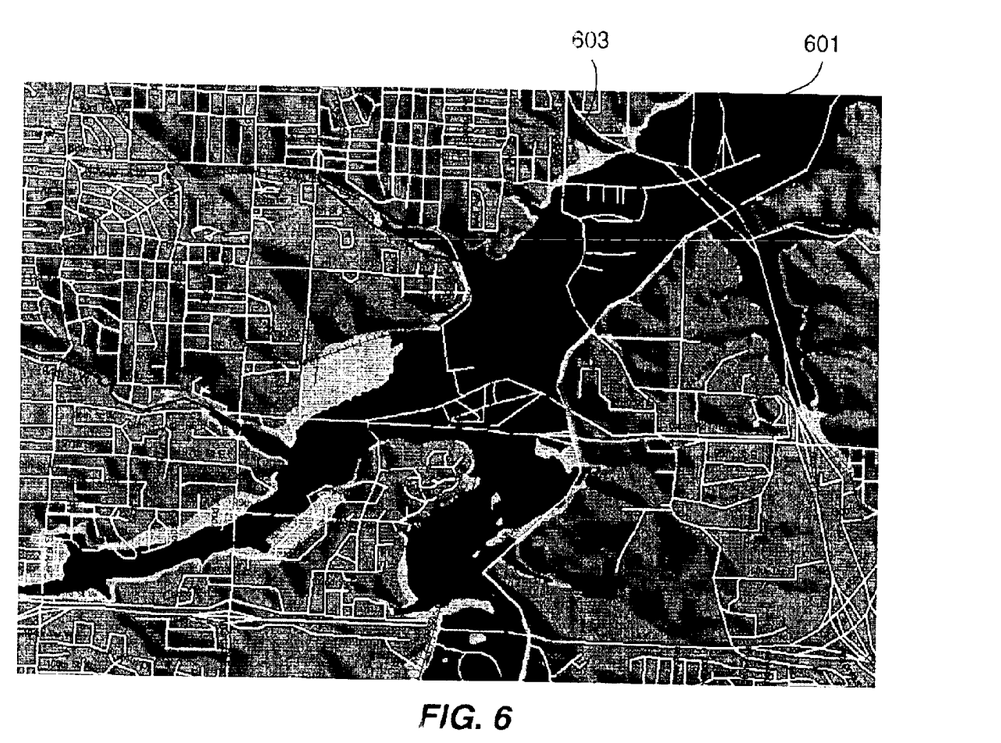
FIG. 6 illustrates a frame of an inundation map including an indication of flood certainty.

Because of the uncertainty whether the river will reach 725 feet or not, additional animation frames may illustrate the basin filled to 725 feet using a second color in areas that the basin is filled beyond the certain 720 feet. FIG. 6 illustrates a frame of an animation where a first region 601 is virtually certain to flood, and is illustrated in a first color, and a second region 603 might or might not flood, and is illustrated in a second color. A lighter or dithered color or darkness level, for example, may be used in the region where it is uncertain whether the flood crest will reach it. Darker colors or colors associated with hazards (e.g., red) may be used in areas more likely to flood, and lighter colors, or colors associated with lesser threats (e.g., yellow), may be used in areas less certain to flood. Alternative color schemes may be used, depending on user preference, etc.

Once the animated inundation map has been created, the animated map may be displayed on an output device, such as display device 323, a website, or via television. Such an animated inundation map is particularly acceptable to television audiences because it is easy to understand, informative, and engaging to viewers through the use of animation and multiple colors. In addition, the animation may be paused at predetermined or user-determined intervals to allow an on-screen newscaster, such as a meteorologist, to explain the map and the uncertainty levels of a flood that it represents. For example, a meteorologist's presentation with respect to the animated inundation map illustrated in FIGS. 5A–5E might include the following:

"Heavy rains over the Blue River Basin are going to result in flooding in south Kansas City in the next 24 hours. If the rain stops in the next few minutes, the Blue River will reach two feet above flood stage around 95$^{th}$ Street as indicated on our map (FIG. 5A fills from zero to two feet on screen, resulting in FIG. 5B). The National Weather Service indicates, however, an additional one inch of rain may fall, which would result in the level of the Blue River reaching four feet above flood stage (FIG. 5B, on the air, fills from two to four feet above flood stage, resulting in FIG. 5C). However, our exclusive Reverse Radar System from WeatherData indicates between three and four inches of rainfall in the next two hours. If so, the ultimate flood stage in South Kansas City will be between six feet (animation fills to six feet above flood stage, ending in FIG. 5D) and eight feet (animation fills to eight feet above flood stage, ending in FIG. 5E), resulting in a major flood."

One or more aspects of the invention may be embodied in computer-executable instructions, such as in one or more program modules, executed by one or more computers or other devices, e.g., computer 301. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

While the invention has been described with respect to specific examples including presently preferred modes of carrying out the invention, those skilled in the art will appreciate that there are numerous variations and permutations of the above described systems and techniques. Thus, the spirit and scope of the invention should be construed broadly as set forth in the appended claims.

We claim:

1. A computer-assisted method for creating an inundation map, comprising:
    (a) receiving a flood forecast comprising a localized flood level for each of a plurality of river gauges; and
    (b) determining a normalized flood level for each received localized flood level based on the river gauge to which each localized flood level corresponds.

2. The method of claim 1, further comprising:
    (c) plotting the normalized flood levels on a map.

3. The method of claim 2, wherein (a)–(c) are performed in real time as a flood causing event is occurring.

4. The method of claim 1, wherein each normalized flood level is expressed as an elevation above sea level.

5. The method of claim 4, wherein (b) comprises, for each received localized flood level:
    i. determining a datum value of the river gauge to which the localized flood level corresponds, wherein the datum value represents an elevation above sea-level of a base value of the river gauge; and
    ii. adding the received localized flood level to the datum value.

6. The method of claim 4, further comprising plotting the normalized flood levels on a map by illustrating on the map a basin filled to an elevation of a normalized flood level determined in (b).

7. The method of claim 4, wherein the flood forecast comprises a plurality of localized flood levels for each of the plurality of river gauges, and further comprising:

(d) repeating the determining step for the plurality of localized flood levels for each of the plurality of river gauges, wherein plotting comprises illustrating in a first frame of an animation a basin filled to a first elevation determined in (b) based on a first localized flood level for each of the plurality of river gauges, and illustrating in a second frame of the animation the basin filled to a second elevation determined in (b) based on a second localized flood level for each of the plurality of river gauges.

8. The method of claim 7, wherein in the second frame of the animation, a first filled in portion is illustrated in a first color, and a second filled in portion is illustrated in a second color, wherein the first portion corresponds to the filled in portion of the first frame of the animation, and the second portion corresponds to the filled in portion beyond that which is filled in the first frame of the animation.

9. The method of claim 8, wherein the second color is lighter than the first color.

10. A computer readable medium storing a data structure, comprising:

a first data portion representing a first frame of an animated inundation map, wherein the first frame illustrates a geographic basin filled in to a first predetermined elevation based on flood warning information; and a second data portion representing a second frame of the animated inundation map, wherein the second frame illustrates the geographic basin filled in to a second predetermined elevation based on the flood warning information, wherein the flood warning information comprises a flood stage level for each of a plurality of river gauges, and wherein the flood stage level for each of the plurality of river gauges has been normalized.

11. The computer readable medium of claim 10, wherein in the second data portion, a first filled in portion is illustrated in a first color, and a second filled in portion is illustrated in a second color, wherein the first filled in portion corresponds to the filled in portion of the first frame of the animation, and the second filled in portion corresponds to the portion filled beyond that which is filled in the first frame of the animation.

12. The computer readable medium of claim 11, wherein the second color indicates a lower threat level than the first color.

13. The computer readable medium of claim 10, further comprising a third data portion of one or more animation frames illustrating the geographic basin gradually filled in from the first predetermined elevation to the second predetermined elevation.

14. A computer readable medium storing computer executable instructions that, when executed, perform a method for creating an inundation map, comprising:

(a) receiving a flood forecast comprising a localized flood level for each of a plurality of river gauges;

(b) determining a normalized flood level for each received localized flood level based on the river gauge to which each localized flood level corresponds.

15. The computer readable medium of claim 14, wherein the computer executable instructions further comprise:

(c) plotting the normalized flood levels on a map.

16. The computer readable medium of claim 15, wherein the flood forecast comprises a plurality of localized flood levels for each of the plurality of river gauges, and wherein the computer readable instructions further comprise:

(d) repeating the determining step for the plurality of localized flood levels for each of the plurality of river gauges, and wherein plotting comprises illustrating in a first frame of an animation a basin filled to a first elevation determined in (b) based on a first normalized flood level for each of the plurality of river gauges, and illustrating in a second frame of the animation the basin filled to a second elevation determined in (b) based on a second normalized flood level for each of the plurality of river gauges.

17. The computer readable medium of claim 16, wherein in the second frame of the animation, a first filled in portion is illustrated in a first color, and a second filled in portion is illustrated in a second color, wherein the first portion corresponds to the filled in portion of the first frame of the animation, and the second portion corresponds to the filled in portion beyond that which is filled in the first frame of the animation.

18. The computer readable medium of claim 14, wherein each normalized flood level is expressed as an elevation above sea level.

19. The computer readable medium of claim 18, wherein (b) comprises, for each received localized flood level:

i. determining a datum value of the river gauge to which the localized flood level corresponds, wherein the datum value represents an elevation above sea-level of a base value of the river gauge; and ii. adding the received localized flood level to the datum value.

20. The computer readable medium of claim 18, further comprising plotting the normalized flood levels on a map by illustrating on the map a basin filled to an elevation of a normalized flood level determined in (b).

21. A method for creating an animated inundation map, comprising:

(a) receiving a flood forecast comprising a plurality of localized flood levels for each of a plurality of river gauges;

(b) determining a normalized sea-level elevation flood level corresponding to each received localized flood level by determining a datum value of the river gauge to which the each localized flood level corresponds, wherein the datum value represents an elevation above sea-level of a base value of the river gauge, and adding each localized flood level to the datum value of the river gauge to which each localized flood level corresponds; and (c) plotting the normalized flood levels by illustrating in a first frame of an animation a geographic map of a flood basin filled to a first normalized flood level determined in (b) based on a first localized flood level for each of the plurality of river gauges, and illustrating in a second frame of the animation the basin filled to a second normalized flood level determined in (b) based on a second localized flood level for each of the plurality of river gauges, wherein in the second frame of the animation, a first filled in portion is illustrated in a first color, and a second filled in portion is illustrated in a second color, wherein the first filled in portion corresponds to the filled in portion of the first frame of the animation, and the second portion corresponds to the filled in portion of the second frame of the animation beyond that which is filled in the first frame of the animation.

* * * * *